United States Patent Office 3,044,985
Patented July 17, 1962

3,044,985
ACRYLYL DERIVATIVES OF β-DIKETONES AND THEIR POLYMERS
Lorraine G. Donaruma, Media, Pa., assignor to E. I. du Pont de Nemours and Company, Wilmington, Del., a corporation of Delaware
No Drawing. Filed July 26, 1960, Ser. No. 45,304
16 Claims. (Cl. 260—63)

This invention relates to polymerizable compounds. More particularly, it relates to acrylyl derivatives of β-diketones and to their polymers.

The unusual properties associated with many chelated structures has brought about considerable interest in new chelating agents. Of especial importance are those which may be incorporated into polymer molecules for use in, for example, metal winning and catalysis.

It is an object of this invention to provide a new class of chelating agents. It is a further object of the invention to provide chelating agents which may be polymerized. It is a still further object of the invention to provide polymers containing chelate-forming functional groups. Other and additional objectives will become apparent from a consideration of the ensuing specification and claims.

These objects are accomplished according to this invention which provides a new class of chemical compounds represented by the general formula:

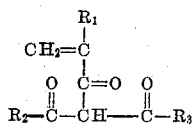

wherein $R_1$ is hydrogen, methyl or ethyl and each $R_2$ and $R_3$, which may be the same or different, is a monovalent hydrocarbon radical selected from the group consisting of alkyl and aryl. Preferably, the $R_2$ and $R_3$ substituents are phenyl and/or lower alkyl containing from one to four carbon atoms. These compounds are designated herein as acrylyldiacylmethanes or, alternatively, as vinyl triketones.

This invention also provides novel polymeric products, including homopolymers and copolymers, obtained by polymerizing the acrylyldiacylmethanes. The novel polymeric products contain the characteristic recurring unit

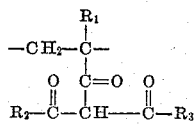

wherein the R legends correspond to those defined for the monomers described above.

Copolymerization of the monomer or the homopolymer with an ethylenically unsaturated comonomer provides a copolymer containing the characteristic recurring unit

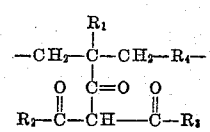

and/or

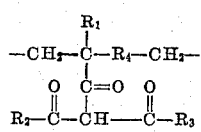

wherein $R_4$ is a mono- or di-substituted methylene radical and the R legends correspond to those defined for the monomers defined above.

Preferably, the novel polymeric products of this invention contain at least 10% by weight of these units.

Compounds of the present invention may be prepared by reacting a solution of a metal enol salt of a β-diketone of the formula

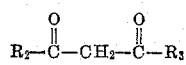

with an acyl halide of the formula

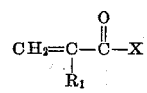

wherein $R_1$, $R_2$ and $R_3$ are as defined above and X is a halogen, including chloride, bromide and iodide. The best rates of reaction and yield are obtained at temperatures between about 40 and about 100° C.

Enol salts of the diketones are prepared by known techniques, as, for example, by treating a β-diketone with a dispersion of sodium in benzene and refluxing until hydrogen ceases to be evolved.

The polymeric products provided by this invention are obtained by homopolymerizing the monomeric compounds or by copolymerizing them with other ethylenically unsaturated compounds capable of undergoing addition polymerization. These polymers are usually prepared by heating the monomer, or mixtures of the comonomers, to a temperature between about 25 and about 150° C. in the presence of a free radical polymerization initiator such as benzoyl peroxide.

The following examples in which parts are by weight are illustrative of the invention.

EXAMPLE I

Methacrylyldiacetylmethane is prepared as follows: To a slurry containing 46 parts of sodium sand in 880 parts of dry benzene are added 200 parts of acetylacetone at a rate permitting gentle reflux. When the addition is complete, the mixture is stirred 12 hours at room temperature in an atmosphere of dry nitrogen. Then 200 parts of methacrylyl chloride are added dropwise and the reaction mixture is heated at reflux temperature for two hours. The suspension is stirred without further heating until the pH, tested with moist pH paper, reaches 5. The suspension is concentrated under vacuum thoroughly triturated with water, and extracted with ether. The organic layer is dried wtih magnesium sulfate and filtered and the solvents are removed under vacuum. The residue is distilled in the presence of 0.5 part of hydroquinone under 0.3 mm. pressure, giving a crude product boiling between 90 and 120° C. Redistillation under 0.25 mm. pressure in the presence of hydroquinone stabilizer gives a product boiling between 74 and 80° C. Upon redistilling this fraction, pure methacrylyldiacetylmethane, boiling at 70.7° C. under 0.25 mm. pressure, $n_D^{25}$ 1.4955–1.4970, is obtained. All distillations are carried out in the presence of 0.5 part of hydroquinone. Analyses, spectra and degradative procedures confirm that the composition and structure of this compound are consistent with the formula

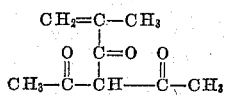

Calculated for $C_9H_{12}O_3$: C, 64.2; H, 7.17. Found: C, 64.4, 64.3; H, 7.60.

This triketone polymerizes to an off-white colored polymer when heated in the presence of 0.1% benzoyl peroxide for 48 hours at approximately 100° C. The monomer and the polymer form stable chelates with iron and copper ions.

EXAMPLE II

Acrylyldiacetylmethane is prepared as follows: To 23 parts of sodium sand dispersed in 440 parts of dry benzene is added 100 parts of acetylacetone at a rate to permit gentle reflux. When the addition is complete, the mixture is stirred at room temperature in a nitrogen atmosphere for 12 hours. Then, 100 parts of acrylyl chloride are added dropwise, and the reaction mixture is refluxed for two hours. This treatment is followed by stirring at room temperature until the pH, as determined with moist pH paper, reaches 5. The benzene is partially removed under vacuum. The residue is stirred well with water and extracted with ether. The organic layer is separated, dried with magnesium sulfate and filtered, and the solvent is removed under vacuum. The residue is distilled in the presence of 0.5 part of hydroquinone under 0.15 to 0.20 mm. pressure giving a crude product boiling between 66 and 80° C. Redistillation under the same conditions gives a product boiling over the range 77–91° C. A third distillation, also in the presence of 0.5 part of hydroquinone and under a pressure between 0.15 to 0.20 mm., yields acrylyldiacetylmethane, boiling over the range 67–72° C., $n_D^{25°\ C.}$ 1.5063. Analyses and spectral data indicate the composition and structure of this compound to be consistent with the formula

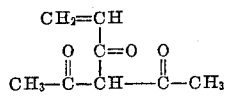

Calculated for $C_8H_{10}O_3$: C, 62.3; H, 6.49. Found: C, 62.1, 62.0; H, 6.85, 6.78.

The acrylyldiacetylmethane polymerizes to a polymer when heated in the presence of 1% azo-bis-(isobutyronitrile) for 48 hours at approximately 50° C. Both the monomer and the polymer form stable chelates with iron and copper ions.

EXAMPLE III

Methacrylyldibenzoylmethane is prepared in the following way: To a dispersion containing 2.3 parts of sodium sand in 352 parts of dry benzene is added slowly 22.4 parts of dibenzoylmethane. When the addition is complete, the mixture is refluxed for six hours and then allowed to stand at room temperature with stirring overnight in a dry nitrogen atmosphere. Methacrylyl chloride, 12.5 parts, is added dropwise, and the resulting mixture is refluxed for three hours in the presence of nitrogen. A solution containing 10 parts of sodium carbonate in 200 parts of water is added, and after stirring 15 minutes, the organic layer is separated. This is treated with two parts of hydroquinone, dried with magnesium sulfate and filtered. The solvent is then removed under vacuum, leaving an oily residue. The oil is dissolved in ethanol and treated with copper acetate to remove the dibenzoylmethane contaminant as an insoluble copper salt. The precipitate is removed by filtration, and the filtrate is dried under vacuum. The residue is boiled with carbon tetrachloride and the insoluble material is removed. The concentrated filtrate contains the copper salt of the methacrylyldibenzoylmethane. Treatment with 10% sulfuric acid produces an oil-like mixture containing crude methacrylyldibenzoylmethane. The oil is precipitated four times from a benzene solution with hexane. Then hexane is added to a benzene solution of the oil until the solution just becomes turbid. After chilling, the solvent is decanted, and the oily material remaining is evaporated under vacuum, yielding a brown solid product. Analyses indicate that the product contains methacrylyldibenzoylmethane having the formula

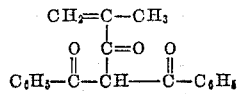

This triketone forms a homopolymer when heated at 160° C. for several hours.

EXAMPLE IV

Preparation of Methacrylyldiacetylmethane/Styrene Copolymer

A mixture containing 10 parts of methacrylyldiacetylmethane, 90 parts of styrene, and 0.1 part of benzoyl peroxide is sealed in a heavy-walled glass tube and heated at 100° C. for 12 hours. At the completion of the reaction, the tube is cooled and opened, and the polymer product is dissolved out in benzene. The benzene solution is concentrated, and the polymer is reprecipitated by the addition of n-hexane. The dissolution and reprecipitation are repeated three times. The product is essentially monomer-free. The molecular weight of the styrene-methacrylyldiacetylmethane copolymer, determined by light scattering techniques, is found to be 356,000. The polymer forms stable chelates with iron and copper ions.

EXAMPLE V

Preparation of Methacrylyldiacetylmethane/Vinyl Acetate Copolymer

Following the procedure of Example IV, employing a mixture containing 10 parts of methacrylyldiacetylmethane, 90 parts of vinyl acetate and 0.1 part of benzoyl peroxide, a copolymer is produced having a molecular weight of 3500–4300, as determined by ebullioscopic measurements. The polymer forms stable chelates with iron and copper ions.

EXAMPLE VI

Preparation of Methacrylyldiacetylmethane/Methyl Methacrylate Copolymer

Following the procedure of Example IV, substituting a mixture containing 10 parts of methacrylyldiacetylmethane, 90 parts of methyl methacrylate and 0.1 part of benzoyl peroxide, a copolymer having a molecular weight of 2–2½ million as determined by light scattering techniques is obtained. The polymer forms stable chelates with iron and copper ions.

EXAMPLE VII

Preparation of Methacrylyldiacetylmethane/Ethyl Acrylate Copolymer

Following the procedure of Example IV except that a mixture containing 10 parts of methacrylyldiacetylmethane, 90 parts of ethyl acrylate and 0.1 part of benzoyl peroxide is substituted, a copolymer having a molecular weight of 300,000 as determined by light scattering techniques is produced. The polymer forms stable chelates with iron and copper ions.

EXAMPLE VIII

When the procedures described in Examples IV, V, VI and VII are applied, using acrylyldiacetylmethane instead of methacrylyldiacetylmethane, copolymers are similarly produced.

EXAMPLE IX

When the procedures described in Examples IV, V, VI and VII are applied, using methacrylyldibenzoylmethane instead of methacrylyldiacetylmethane, copolymers are similarly produced.

EXAMPLE X

A mixture containing 5 parts of methacrylyldiacetylmethane, 0.1 part of acrylonitrile and 0.1% of benzoyl peroxide is sealed in a tube swept with nitrogen and heated for 48 hours at 100° C. The tube is opened when cool and the contents are dissolved in the least amount of benzene. Petroleum ether is added until precipitation occurs and the mixture is allowed to stand until the supernatent liquid becomes clear. Additional petroleum ether is added to the supernatent liquid, the mixture is allowed to stand, etc., and the procedure is repeated until there is no further precipitation. The petroleum ether is decanted and the solid is taken up in boiling benzene. The benzene solution is cooled and concentrated and the clear liquid is decanted. The polymer is precipitated from the liquid with petroleum ether. The solid is removed by filtration, dried and analyzed. Analyses indicate that the methacrylyldiacetylmethane is intact in the polymer molecule and that the diacetylmethane to acrylonitrile ratio is 2:1. The polymer contains about 85% by weight of the triketone monomer.

In addition to the triketones of the examples, this invention includes compounds such as methacrylylbenzoylacetylmethane, acrylylbutyrylpropionylmethane, α-ethylacrylyldipropionylmethane, methacrylyldi(α-toluyl)methane, acrylyldi(hexahydro-benzoyl)methane and the like.

The novel triketones are produced by a condensation reaction between the enolate of a β-diketone and an acrylic acid acyl halide. The reaction is carried out in an inert solvent and at slightly elevated temperatures.

The enol salts most useful and, therefore, preferred in the process are the sodium salts of β-diketones having the formula

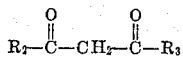

wherein $R_2$ and $R_3$ are hydrocarbon radicals selected from the group consisting of alkyl and aryl. However, other metal salts such as the potassium, calcium, lithium, etc. salts are operative in the process. The acid chlorides of acrylic, α-methylacrylic and α-ethylacrylic acids comprise the preferred coreactants. The corresponding bromides and iodides are suitable in the process, however, and may be employed if desired. Typical of the alkyl and aryl radicals represented by $R_2$ and $R_3$ are methyl, ethyl, propyl, isopropyl, cyclohexyl, cyclopentyl, benzyl, phenyl, naphthyl, methylphenyl, methylcyclohexyl, etc. Representative compounds are acetylacetone, benzoylacetone, dibenzoylmethane, 2,4-heptanedione and the like.

The reaction takes place readily when the reactants are contained in a solvent such as dry benzene, xylene, toluene or certain ethers such as diethyl ether, and aliphatic hydrocarbons, such as hexane, heptane, and the like, which have been treated to remove traces of peroxide or to which a polymerization inhibitor such as hydroquinone has been added. In certain instances, such as for the preparation of the acetyl derivatives, excess acetylacetone may be employed as the solvent.

Refluxing the solutions containing the reactants provides convenient operating temperatures. These preferably range between about 40 and about 100° C., although higher and lower temperatures are permissible. Low temperatures are limited primarily by the slow rate of reaction whereas upper temperatures are limited by the heat-induced polymerization of the particular monomeric product. Air is generally excluded from the reaction vessel and is replaced by dry nitrogen or other chemically inert gases in order to reduce the possibility of introducing polymerization initiators into the reaction zone. Premature polymerization of the monomeric products is inhibited by the addition of a stabilizer such as hydroquinone, quinone, benzoquinone, catechol, p-tertiary butyl catechol, p-nitroso dimethylaniline, cuprous chloride, and the like, concentrations of about 0.3% being adequate.

It is preferred that the reactants be employed in nearly stoichiometric proportions, with the acid halide present in slight excess. However, lesser or greater quantities may be utilized although a great part of the efficiency of the process will be lost. Only a fraction of the material will be converted, and this does not constitute practice of the invention in its most advantageous manner.

The monomeric triketones of this invention undergo conventional free radical-initiated polymerization to form homopolymers and copolymers. The polymers and copolymers are easily prepared by conventional methods. A suitable technique consists of heating a polymerization mixture in the presence of a free-radical polymerization initiator such as dibenzoyl peroxide, t-butyl peroxide or azo-bis-(isobutyronitrile). Temperatures ranging from about 25 to about 150° C. are generally satisfactory although the range from about 50 to about 100° C. is preferred. It will be recognized by those skilled in the art, however, that the specific temperature employed in any specific case depends upon the particular initiator and particular unsaturated monomers being employed.

Copolymeric compositions containing any amount of the chelating monomers of this invention possess improved characteristics. Those polymer compositions containing at least about 10% by weight of the chelating monomer, however, are more greatly improved, and, consequently, are preferred embodiments of this invention. The extent of improvement is proportional to the number of chelating units present in the polymer and may constitute 100% of the polymer is desired.

Typical ethylenically unsaturated comonomers (containing either vinyl or vinylidene groups) which may be polymerized with the acrylyldiacylmethanes include vinyl halides, such as vinyl chloride and vinyl bromide; vinylidene chloride; vinyl esters of carboxylic acids such as vinyl acetate, vinyl proprionate, vinyl butyrate and vinyl benzoate; esters of ethylenically unsaturated acids, such as methyl acrylate, ethyl acrylate, butyl acrylate, allyl acrylate and the corresponding esters of methacrylic and ethacrylic acids; vinyl aromatic compounds such as styrene, divinyl benzene, o-chlorostyrene, p-ethylstyrene, vinyl naphthalene; vinyl ethers such as vinyl methyl ether; dienes such as butadiene; acrylamide and N-substituted acrylamides, such as N-methylacrylamide; acrylonitrile; vinylacetylene; divinylacetylene and the like.

Therefore, the $R_4$ group in the formula representation of the copolymer repeat unit may be described as a mono- or di-substituted methylene radical, derived from the comonomers; for instance, a halo substituted methylene radical, such as chloro-, bromo-, or dichloromethylene; an aromatic substituted methylene radical, such as phenylmethylene and naphthylmethylene; an ester substituted methylene radical, such as acetoxymethylene and benzoxymethylene; and radicals such as cyanomethylene; carbamylmethylene; propionylmethylene; acetylmethylene; acetylmethylmethylene; and carbethoxymethylmethylene and the like.

The products of this invention contain structural features which permit them to form stable chelates with many metal ions, particularly copper and iron. The chelates of the monomers are formed simply by contacting the monomer, either in solution or as the solid, with aqueous solutions of metal ions at a pH at which the metal is hydrolytically stable. The chelates are usually insoluble and precipitate out. Chelates of the polymers are formed in the same way. Chelates form with the solid polymer or with solutions of the polymer on contact with metal ion solutions. Hence they are useful chelating agents and may be used, for example, in metal ion control. The monomeric products are particularly useful as monomers which may be added to polymerization recipes to provide polymers containing chelate-forming functional groups. The insoluble polymer products may be used in much the same way as conventional ion-exchange resins and are of special value in removing small amounts of metal-ion contaminants from solutions. Solutions of both the monomeric and polymeric chelating agents may be employed in solvent extraction techniques. Chelating polymers have the advantage over conventional ion exchangers in showing greater selectivity for metal ions.

What is claimed is:

1. A composition of matter represented by the general formula

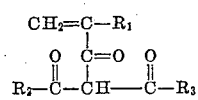

wherein $R_1$ is a radical selected from the group consisting of hydrogen, methyl and ethyl, and wherein $R_2$ and $R_3$ are each hydrocarbon radicals selected from the group consisting of alkyl and aryl.

2. The composition of matter of claim 1 wherein $R_1$ is a methyl radical.

3. The composition of matter of claim 1 wherein $R_1$ is hydrogen.

4. The composition of matter of claim 1 wherein $R_2$ and $R_3$ are methyl radicals.

5. A composition of matter represented by the structural formula

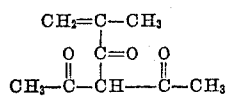

6. A composition of matter represented by the structural formula

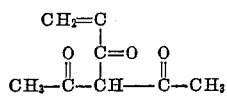

7. A composition of matter represented by the structural formula

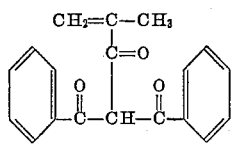

8. A homopolymer represented by the repeating unit of the structural formula

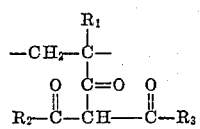

wherein $R_1$ is a radical selected from the group consisting of hydrogen, methyl and ethyl and each of $R_2$ and $R_3$ is a hydrocarbon radical selected from the group consisting of alkyl and aryl.

9. The homopolymer of claim 8 wherein $R_1$, $R_2$ and $R_3$ are methyl.

10. The homopolymer of claim 8 wherein $R_1$ is hydrogen and $R_2$ and $R_3$ are methyl.

11. An addition copolymer represented by recurring units of the formula

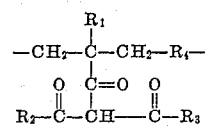

wherein $R_1$ is a radical selected from the group consisting of hydrogen, methyl and ethyl; each of $R_2$ and $R_3$ is a hydrocarbon radical selected from the group consisting of alkyl and aryl and $R_4$ is a radical selected from the group consisting of monosubstituted methylene and disubstituted methylene.

12. The process comprising reacting in substantially stoichiometric proportions a solution of a metal enol salt of a β-diketone of the formula

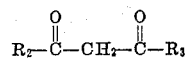

wherein each of $R_2$ and $R_3$ is a hydrocarbon radical selected from the group consisting of alkyl and aryl, with an acyl halide of the formula

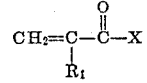

wherein $R_1$ is a radical selected from the group consisting of hydrogen, methyl and ethyl and X is a halogen selected from the group consisting of chloride, bromide and iodide, at a temperature of at least 40° C.

13. The process of claim 12 wherein the metal enol salt and acyl halide are reacted in the presence of a polymerization stabilizer.

14. The process comprising heating to a temperature between about 25 and about 150° C., at least about 90% by weight of a composition of the formula

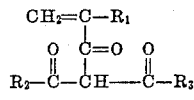

to provide a composition of the formula

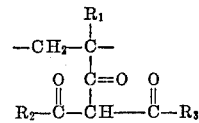

wherein $R_1$ in each formula is a radical selected from the group consisting of hydrogen, methyl and ethyl, and each of $R_2$ and $R_3$ in each formula is a hydrocarbon radical selected from the group consisting of alkyl and aryl.

15. The process comprising copolymerizing, at a temperature between about 25 and about 150° C., an ethylenically unsaturated monomer with from about 10% to about 90% by weight of a composition of the formula

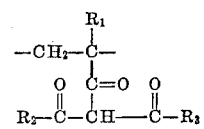

to provide a copolymeric composition of the formula

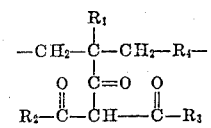

wherein $R_1$ in each formula is a radical selected from the group consisting of hydrogen, methyl and ethyl, and each of $R_2$ and $R_3$ in each formula is a hydrocarbon radical selected from the group consisting of alkyl and aryl, and $R_4$ is a radical selected from the group consisting of monosubstituted methylene and disubstituted methylene.

16. An addition copolymer comprising at least about 10% by weight of a monomer represented by the structural formula

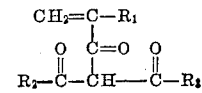

and an ethylenically unsaturated comonomer.

No references cited.